United States Patent
Melancon et al.

(10) Patent No.: US 6,730,397 B2
(45) Date of Patent: May 4, 2004

(54) SILICONE PRESSURE SENSITIVE ADHESIVES, ARTICLES AND METHODS

(75) Inventors: Kurt C. Melancon, White Bear Lake, MN (US); Anthony M. Kremer, Woodbury, MN (US); Audrey A. Sherman, St. Paul, MN (US); Zhiming Zhou, Woodbury, MN (US); Michael L. Tumey, St. Paul, MN (US); Duane A. Lunsford, Stacy, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/027,587

(22) Filed: Dec. 18, 2001

(65) Prior Publication Data

US 2003/0152768 A1 Aug. 14, 2003

(51) Int. Cl.$^7$ ................................ B32B 27/28
(52) U.S. Cl. ..................... 428/355 R; 428/355 CN; 428/447; 428/448; 525/477; 528/38
(58) Field of Search ................ 428/355 R, 355 CN, 428/447, 448; 525/477, 478; 528/38

(56) References Cited

U.S. PATENT DOCUMENTS

| | | |
|---|---|---|
| 2,676,182 A | 4/1954 | Daudt et al. |
| 2,736,721 A | 2/1956 | Dexter |
| 3,627,851 A | 12/1971 | Brady |
| 3,772,247 A | 11/1973 | Flannigan |
| 3,890,269 A | 6/1975 | Martin |
| 3,929,704 A | 12/1975 | Horning |
| 4,309,520 A | 1/1982 | Blizzard |
| 4,415,615 A | 11/1983 | Esmay et al. |
| 4,584,355 A | 4/1986 | Blizzard et al. |
| 4,661,577 A | 4/1987 | Jo Lane et al. |
| 4,749,590 A | 6/1988 | Klingen et al. |
| 4,882,377 A | 11/1989 | Sweet et al. |
| 4,900,474 A | 2/1990 | Terae et al. |
| 4,935,484 A | 6/1990 | Wolfgruber et al. |
| 5,001,012 A | 3/1991 | Sarkar et al. |
| 5,024,880 A | 6/1991 | Veasley et al. |
| 5,026,890 A | 6/1991 | Webb et al. |
| 5,028,679 A | 7/1991 | Terae et al. |
| 5,045,391 A | 9/1991 | Brandt et al. |
| 5,082,706 A | 1/1992 | Tangney |
| 5,110,882 A | 5/1992 | Hamada et al. |
| 5,110,890 A | 5/1992 | Butler |
| 5,118,775 A | 6/1992 | Inomata et al. |
| 5,190,827 A | 3/1993 | Lin |
| 5,214,119 A | 5/1993 | Leir et al. |
| 5,236,997 A | 8/1993 | Fujiki |
| 5,248,716 A | 9/1993 | Lin et al. |
| 5,248,739 A | 9/1993 | Schmidt et al. |
| 5,276,122 A | 1/1994 | Aoki et al. |
| 5,290,615 A | 3/1994 | Tushaus et al. |
| 5,302,685 A | 4/1994 | Tsumura et al. |
| 5,319,040 A | 6/1994 | Wengrovius et al. |
| 5,352,527 A | 10/1994 | Harada et al. |
| 5,461,134 A | 10/1995 | Leir et al. |
| 5,475,124 A | 12/1995 | Mazurek et al. |
| 5,512,650 A | 4/1996 | Leir et al. |
| 5,576,110 A | 11/1996 | Lin et al. |
| 5,602,214 A | 2/1997 | Lin et al. |
| 5,741,876 A | 4/1998 | Carpenter, II et al. |
| 5,776,614 A | 7/1998 | Cifuentes et al. |
| 5,804,610 A | 9/1998 | Hamer et al. |
| 5,916,981 A | 6/1999 | Cifuentes et al. |
| 5,932,321 A | 8/1999 | Eisele et al. |
| 6,007,914 A | 12/1999 | Joseph et al. |
| 6,103,152 A | 8/2000 | Gehlsen et al. |

FOREIGN PATENT DOCUMENTS

| | | |
|---|---|---|
| EP | 0 380 236 B1 | 8/1990 |
| EP | 0 667 382 A1 | 8/1995 |
| EP | 0 867 493 A2 A3 | 9/1998 |
| JP | 2-36234 | 2/1990 |
| JP | 2135210 | 5/1990 |
| JP | 2296832 | 12/1990 |
| WO | WO 96/30426 A1 | 10/1996 |
| WO | WO 96/34028 A1 | 10/1996 |
| WO | WO 96/34029 A1 | 10/1996 |
| WO | WO 96/34030 A1 | 10/1996 |
| WO | WO 96/35458 A2 A3 | 11/1996 |
| WO | WO 97/40103 A1 | 10/1997 |
| WO | WO 98/15602 A1 | 4/1998 |
| WO | WO 98/17726 A1 | 4/1998 |

OTHER PUBLICATIONS

American Society for Testing and Materials, "ASTM D–3654–88, Standard Test Method for Holding Power of Pressure–Sensitive Tapes," *Annual Book of ASTM Standards*, pp. 545–548 (1988).
American Society for Testing and Materials, "ASTM D–3330–90, Standard Test Methods for Peel Adhesion of Pressure–Sensitive Tape at 180° Angle," *Annual Book of ASTM Standards*, pp. 485–488 (1990).
American Society for Testing and Materials, "ASTM D–2979–95, Standard Test Method for Pressure–Sensitive Tack Adhesives Using an Inverted Probe Machine," *Annual Book of ASTM Standards*, pp. 183–185 (1995).
*Encyclopedia of Polymer Science and Engineering*, vol. 15, John Wiley & Sons, New York, 1989, pp. 265–270.
Tyagi et al., "Segmented organosiloxane copolymers: 2. Thermal and mechanical properties of siloxane–urea copolymers," *Polymer*, 25(12):1807–1816 (Dec., 1984).

*Primary Examiner*—Robert Dawson
*Assistant Examiner*—Christopher Keehan
(74) *Attorney, Agent, or Firm*—Daniel R. Pastirik; Scott A. Bardell

(57) ABSTRACT

Pressure sensitive adhesives and methods wherein the pressure sensitive adhesives include a silicone tackifying resin having no greater than about 1.5 wt-% Si—OH functional groups and a polydiorganosiloxane polyurea copolymer.

70 Claims, No Drawings

SILICONE PRESSURE SENSITIVE ADHESIVES, ARTICLES AND METHODS

FIELD OF THE INVENTION

The invention relates to silicone adhesives, articles, and methods of making and using. The adhesives are particularly useful on articles such as tapes, particularly foam tapes, for example.

BACKGROUND

Pressure sensitive adhesives containing polydiorganosiloxane polyurea copolymers and a compatible tackifier are well known. They have a variety of applications because they can possess one or more of the following properties: high thermal stability; high oxidative stability; permeability to many gases; low surface energy; low index of refraction; low hydrophilicity; dielectric properties; biocompatibility; and adhesive properties. Examples of such pressure sensitive adhesives are disclosed in U.S. Pat. Nos. 5,461,134 (Leir et al.), 5,512,650 (Leir et al.), 5,475,124 (Mazurek et al.), as well as International Publication Nos. WO 96/30426 (3M Co., St. Paul, Minn.), WO 96/34028 (3M Co.), WO 96/34029 (3M Co.), and WO 98/15602 (3M Co.).

Although silicone pressure sensitive adhesives are known to adhere to a wide variety of substrates, there is still a need for adhesives and adhesive articles, particularly tapes such as foam tapes, that provide an effective peel strength and shear strength to such substrates, without the need for a primer or other chemical or physical surface treatment of the substrate.

SUMMARY OF THE INVENTION

The present invention provides pressure sensitive adhesives (PSAs), adhesive articles, and methods. Preferably, the articles are in the form of tapes, such as foam tapes, for example. Significantly, the PSAs include a polydiorganosiloxane polyurea copolymer and a silicone tackifying resin with little or no silanol (Si—OH) functionality, yet provide high and stable adhesion to a wide variety of substrates. Prior to this it was not appreciated that for silicone polyurea-based pressure sensitive adhesive, little or no silanol functionality in the silicone tackifying resin could enhance adhesion.

The adhesive of the present invention can form a discontinuous layer (e.g., pattern) on the substrate (e.g., backing of a tape) or it can form a continuous layer on at least one major surface thereof. It is a pressure sensitive adhesive, which unlike a heat activated adhesive, typically uses pressure to engage adhesion at room temperature (about 20° C. to about 30° C.) and does not require the use of a heating device.

Generally, the pressure sensitive adhesives of the present invention include: a silicone tackifying resin having no greater than about 1.5% by weight (wt-%) Si—OH functional groups (preferably, no greater than about 1.2 wt-%, more preferably, no greater than about 1.0 wt-%, and most preferably, no greater than about 0.8 wt-%), based on the total weight of the silicone tackifying resin; and a polydiorganosiloxane polyurea copolymer. Significantly, such pressure sensitive adhesives, as a result of the low silanol content in the silicone tackifying resin, adhere to both high and low surface energy materials better than conventional silicone adhesives with higher silanol content. Methods of making such adhesives are also provided.

In one embodiment, the present invention provides a silicone pressure sensitive adhesive that includes: a silicone tackifying resin having no greater than about 1.5 percent by weight (wt-%) Si—OH functional groups; and a polydiorganosiloxane polyurea copolymer. Preferably, the pressure sensitive adhesive adheres to both high and low surface energy materials as well as those in between, wherein the high surface energy material has a surface energy above about 70 dynes/centimeter (dynes/cm) and the low surface energy material has a surface energy below about 50 dynes/cm.

In another embodiment, the pressure sensitive adhesive includes: a silicone tackifying resin having no greater than about 1.5 wt-% Si—OH functional groups; and a polydiorganosiloxane polyurea copolymer; wherein the pressure sensitive adhesive satisfies at least one of the following criteria: the pressure sensitive adhesive adheres to both high and low surface energy materials as well as those in between, wherein the high surface energy material has a surface energy above about 70 dynes/cm and the low surface energy material has a surface energy below about 50 dynes/cm; when the adhesive is disposed on a 50.8-micrometer thick PET backing at an adhesive thickness of 50.8 micrometers to form a single-coated tape and adhered to a high density polyethylene coupon, the tape displays a 180° peel force of at least about 55 Newtons per decimeter (N/dm) when measured at a rate of 30.5 cm/min at room temperature after a dwell time of one minute at room temperature; when the adhesive is disposed on a 50.8-micrometer thick PET backing at an adhesive thickness of 50.8 micrometers to form a single-coated tape and adhered to a stainless steel coupon, the tape displays a 180° peel force of at least about 60 N/dm when measured at a rate of 30.5 centimeters/minute (cm/min) at room temperature after a dwell time of one minute at room temperature; when the adhesive is disposed on a 1 millimeter thick 87.5/12.5 isooctyl acrylate/acrylic acid foam backing at an adhesive thickness of 50.8 micrometers to form a double-coated tape and adhered to a high density polyethylene coupon, the tape displays a 90° peel force of at least about 230 N/dm when measured at a rate of 30.5 cm/min at room temperature after a dwell time of 72 hours at room temperature; when the adhesive is disposed on a 1 millimeter thick 87.5/12.5 isooctyl acrylate/acrylic acid foam backing at an adhesive thickness of 50.8 micrometers to form a double-coated tape and adhered to a stainless steel coupon, the tape displays a 90° peel force of at least about 300 N/dm when measured at a rate of 30.5 cm/min at room temperature after a dwell time of 72 hours at room temperature; or when the adhesive is disposed on a 1 millimeter thick 87.5/12.5 isooctyl acrylate/acrylic acid foam backing at an adhesive thickness of 50.8 micrometers to form a double-coated tape and adhered to a polypropylene coupon, the tape displays a 90° peel force of at least about 400 N/dm when measured at a rate of 30.5 cm/min at room temperature after a dwell time of 72 hours at room temperature.

In yet another embodiment, the present invention provides a pressure sensitive adhesive that includes: a silicone tackifying resin having no greater than about 1.5 wt-% Si—OH functional groups silicone and an M/Q ratio of at least about 0.7:1.0; and a polydiorganosiloxane polyurea copolymer; wherein the pressure sensitive adhesive adheres to both high and low surface energy materials as well as those in between, wherein the high surface energy material has a surface energy above about 70 dynes/cm and the low surface energy material has a surface energy below about 50 dynes/cm.

In still another embodiment, a pressure sensitive adhesive includes: a silicone tackifying resin having no greater than about 1.5 wt-% Si—OH functional groups silicone and an M/Q ratio of at least about 0.7:1.0; and a polydiorganosiloxane polyurea copolymer including the following repeating unit:

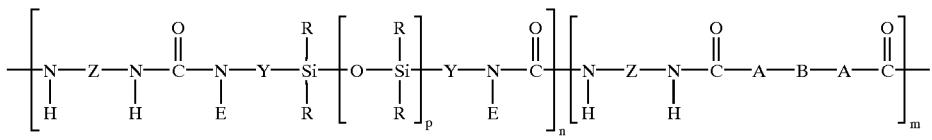

where: each R is independently an alkyl moiety, a vinyl moiety or higher alkenyl moiety, a cycloalkyl moiety, an aryl moiety, or a fluorine-containing group; each Z is independently a polyvalent moiety that is an arylene moiety, an aralkylene moiety, an alkylene moiety, or a cycloalkylene moiety; each Y is independently a polyvalent moiety that independently is an alkylene moiety, an aralkylene moiety or an arylene moiety; each E is independently hydrogen, an alkyl moiety of 1 to 10 carbon atoms, phenyl, or a moiety that completes a ring structure including Y to form a heterocycle; each A is independently oxygen or —N(G)—, wherein each G is independently hydrogen, an alkyl moiety of 1 to 10 carbon atoms, phenyl, or a moiety that completes a ring structure including B to form a heterocycle; B is an alkylene, aralkylene, cycloalkylene, phenylene, polyalkylene, polyalkylene oxide, copolymers, or mixtures thereof, or a moiety completing a ring structure including A to form a heterocycle; m is a number that is 0 to about 1000; n is a number that is equal to or greater than 1; and p is a number that is about 5 or larger.

In yet another embodiment, the present invention provides a pressure sensitive adhesive solution that includes: a silicone tackifying resin having no greater than about 1.5 wt-% Si—OH functional groups; a polydiorganosiloxane polyurea copolymer; an organic solvent; and a processing aid.

In another embodiment, the present invention provides an adhesive article that includes a substrate having disposed on at least one major surface the pressure sensitive adhesive as described above. Adhesive articles include tapes, labels, and other sheeting useful in various formats including, but not limited to, medical, graphics, signage, damping, and analytical applications.

In still another embodiment, the present invention provides an article that includes two substrates and the pressure sensitive adhesive as described above disposed therebetween. Such articles include a vibration damper, a reclosable fastener, a panel, an abrasive pad, a spacer, a body side molding, a flexographic plate, a muntin bar, a spacer, or a sign.

DETAILED DESCRIPTION OF PREFERRED EMBODIMENTS

The present invention provides silicone-based pressure sensitive adhesives, articles on which such adhesives are disposed (e.g., tapes), and methods of making and using such adhesives and articles. The pressure sensitive adhesives include at least one polydiorganosiloxane polyurea copolymer and at least one silicone tackifying resin.

The silicone tackifying resins of the pressure sensitive adhesives of the present invention include little or no silanol functionality, which provide adhesives with high and stable adhesion to a wide variety of substrates. Prior to this it was not appreciated that for silicone polyurea-based pressure sensitive adhesive, little or no silanol functionality in the silicone tackifying resin could enhance adhesion. Also, significantly, there is little or no increase in release force over time when such compositions are disposed on a conventional fluorosilicone release liner (e.g., REXAM No. 20987 from Loparex Inc., Bedford Park, Ill.).

An adhesive article (e.g., tape) of the present invention includes a silicone-based pressure sensitive adhesive, disposed on a backing (i.e., substrate), which may be permanent or temporary, as with a release liner. One particularly preferred article is a tape, such as a foam tape. The backing can be made of a transparent material, or it can be translucent or opaque, for example. As used herein, a pressure sensitive adhesive possesses a balance of the following properties: (1) tack; (2) adherence with no more than finger pressure; (3) sufficient ability to hold onto an adherend; and (4) sufficient cohesive strength. Materials that have been found to function well as PSAs are polymers designed and formulated to exhibit the requisite viscoelastic properties resulting in a desired balance of tack, peel adhesion, and shear holding power.

An adhesive of the present invention preferably adheres well to a wide variety of materials having a wide range of surface energies. Significantly, this includes materials having high surface energies (e.g., above about 70 dynes/cm) and materials having low surface energies (e.g., below about 50 dynes/cm) as well as those in between. Examples of such materials include polymethylmethacrylate (PMMA), polyethylene terephthalate (PET), polyurethane, polyamide (e.g, Nylon-6,6), polyvinylchloride (PVC), iron, stainless steel, copper, aluminum, glass, polyolefins, polystyrene, polycarbonate, polytetrafluoroethylene, painted surfaces, powder-coated surfaces, e.g., powder-coated paints, etc., and combinations thereof.

Significantly, for a comparable molecular weight silicone tackifying resin, use of a silicone tackifying resin with little or no silanol functionality provides an improvement in initial peel adhesion performance using the procedures specified in the Examples Section for transfer tapes. The adhesives of the present invention provide, on average, an 84% greater (ranging from 19% to 194% greater) initial peel adhesion to high density polyethylene (HDPE) relative to adhesives incorporating a comparable molecular weight silicone tackifying resin with greater than 1.5 wt-% silanol functionality. The adhesives of the present invention provide, on average, an 89% greater (ranging from 34% to 216% greater) initial peel adhesion to stainless steel relative to adhesives incorporating a comparable molecular weight silicone tackifying resin with greater than 1.5 wt-% silanol functionality. Preferably, for a comparable tape construction, there is a greater initial peel performance to HDPE (e.g., at least about 19% greater), or to stainless steel (e.g., at least about 34% greater), relative to adhesives incorporating a comparable molecular weight silicone tackifying resin with greater than 1.5 wt-% silanol functionality (i.e., when employing silicone tackifying resins as described herein).

Preferably, when the adhesive is disposed on a 2-mil thick (50.8-micrometer thick) PET backing at an adhesive thickness of 2 mils (50.8 micrometers) to form a single-coated tape and applied to a high density polyethylene (HDPE) coupon as described in the Examples Section, the tape displays an initial 180° peel force of at least about 55 Newtons/decimeter (N/dm), more preferably, at least about 58 N/dm, and most preferably, at least about 60 N/dm, when measured at a rate of 12 inches/minute (30.5 centimeters/minute (cm/min)) at room temperature after a dwell time of one minute at room temperature.

Preferably, when the adhesive is disposed on a 2-mil thick (50.8-micrometer thick) PET backing at an adhesive thickness of 2 mils (50.8 micrometers) to form a single-coated tape and applied to a stainless steel coupon as described in the Examples Section, the tape displays an initial 180° peel force of at least about 60 Newtons/decimeter (N/dm), more preferably, at least about 65 N/dm, and most preferably, at least about 70 N/dm, when measured at a rate of 12 inches/minute (30.5 centimeters/minute (cm/min)) at room temperature after a dwell time of one minute at room temperature.

Preferably, when the adhesive is disposed on both sides of a 1-millimeter (mm) thick acrylic foam backing (an 87.5/12.5 isooctyl acrylate/acrylic acid foam as described in Examples 5 and 6 of the Examples Section) at an adhesive thickness of 2 mils (50.8 micrometers) to form a double-coated tape and applied to a high density polyethylene (HDPE) coupon as described in the Examples Section, the tape displays an initial 90° peel force of at least about 230 N/dm, more preferably, at least about 240 N/dm, and most preferably, at least about 250 N/dm, when measured at a rate of 12 inches/minute (30.5 cm/min) at room temperature after a dwell time of 72 hours at room temperature.

Preferably, when the adhesive is disposed on both sides of a 1-mm acrylic foam backing (an 87.5/12.5 isooctyl acrylate/acrylic acid foam as described in Examples 5 and 6 of the Examples Section) at an adhesive thickness of 2 mils (50.8 micrometers) to form a double-coated tape and applied to a stainless steel coupon as described in the Examples Section, the tape displays an initial 90° peel force of at least about 300 N/dm, more preferably, at least about 350 N/dm, and most preferably, at least about 400 N/dm, when measured at a rate of 12 inches/minute (30.5 cm/min) at room temperature after a dwell time of 72 hours at room temperature.

Preferably, when the adhesive is disposed on both sides of a 1-mm thick acrylic foam backing (an 87.5/12.5 isooctyl acrylate/acrylic acid foam as described in Examples 5 and 6 of the Examples Section) at an adhesive thickness of 2 mils (50.8 micrometers) to form a double-coated tape and applied to a polypropylene (PP) coupon as described in the Examples Section, the tape displays an initial 90° peel force of at least about 400 N/dm, more preferably, at least about 425 N/dm, and most preferably, at least about 450 N/dm, when measured at a rate of 12 inches/minute (30.5 cm/min) at room temperature after a dwell time of 72 hours at room temperature.

Significantly, for a comparable molecular weight silicone tackifying resin, use of a silicone tackying resin with little or no silanol functionality provides an improvement in aged peel adhesion performance using the procedures specified in the Examples Section for transfer tapes (aged for one week at 70° C. followed by 1 day at room temperature). The adhesives of the present invention provide, on average, a 91% greater (ranging from 53% to 189% greater) aged peel adhesion to HDPE relative to adhesives incorporating a comparable molecular weight silicone tackifying resin with greater than 1.5 wt-% silanol functionality. The adhesives of the present invention provide, on average, a 73% greater (ranging from 24% to 98% greater) aged peel adhesion to stainless steel relative to adhesives incorporating a comparable molecular weight silicone tackifying resin with greater than 1.5 wt-% silanol functionality. Preferably, for a comparable tape construction, there is a greater aged peel performance to HDPE (e.g., at least about 53% greater), or to stainless steel (e.g., an at least about 24% greater), relative to adhesives incorporating a comparable molecular weight silicone tackifying resin with greater than 1.5 wt-% silanol functionality (i.e., when employing silicone tackifying resins as described herein).

Also, significantly, for a comparable molecular weight silicone tackifying resin, there is an improvement in aged release force of a fluorosilicone-coated release liner (REXAM No. 20987 from Loparex Inc., Bedford Park, Ill.) from a laminate construction of an adhesive of the present invention. Preferably, after aging an adhesive sample (at an adhesive thickness of about 50.8 micrometers on a fluorosilicone-coated 2-mil (50.8-micrometer) thick PET film) for one week at 70° C. followed by one day at room temperature, the force required to remove a fluorosilicone-coated 2-mil (50.8-micrometer) thick PET film at an angle of 180° is no greater than about 20 N/dm, more preferably, no greater than about 15 N/dm, and most preferably, no greater than about 10 N/dm, when measured according to the procedure described in the Examples Section.

Polydiorganosiloxane Polyurea Copolymers

Herein, copolymer refers to polymers containing two or more different monomers, including terpolymers, tetrapolymers, etc. Preferred polydiorganosiloxane polyurea copolymers suitable for use in the preparation of adhesives according to the present invention are the reaction products of at least one polyamine, wherein the polyamine includes at least one polydiorganosiloxane polyamine (preferably, diamine) with at least one polyisocyanate, and an optional polyfunctional chain extender such as an organic amine and/or alcohol. The mole ratio of isocyanate to amine is preferably in a range of about 0.9:1 to about 1.1:1, more preferably about 0.95:1 to about 1.05:1, and most preferably about 0.97:1 to about 1.03:1. That is, preferred polydiorganosiloxane polyurea copolymers suitable for use in the preparation of pressure sensitive adhesives according to the present invention have polydiorganosiloxane units, polyisocyanate residue units, and optionally, organic polyamine and/or polyol residue units. The polyisocyanate residue units and the polyamine residue units preferably form less than 15% by weight, and more preferably, less than 5% by weight, of the polydiorganosiloxane polyurea copolymer. The polyisocyanate residue is the polyisocyanate minus the —NCO groups and the polyamine residue is the polyamine minus the —NH$_2$ groups. The polyisocyanate residue is connected to the polyamine residue by urea linkages. The polyisocyanate residue is connected to the polyol residue by urethane linkages. Examples of such segmented copolymers are disclosed in U.S. Pat. No. 5,461,134 (Leir et al.) and International Publication Nos. WO 96/34029, WO 96/35458, and WO 98/17726, all to the 3M Co., St. Paul, Minn. As used herein, the term polydiorganosiloxane polyurea encompasses materials having the repeating unit of Formula I.

Preferably, the polydiorganosiloxane polyurea copolymers used in preparing the adhesive of the present invention can be represented by the repeating unit (Formula I):

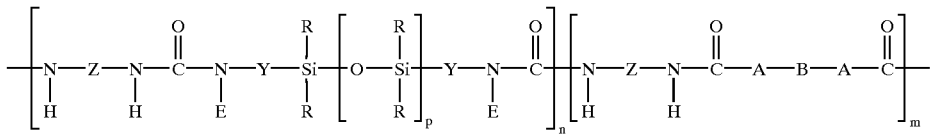

where:
each R is independently an alkyl moiety (preferably having 1 to 12 carbon atoms and may be substituted with, for example, trifluoroalkyl or vinyl groups), a vinyl moiety or higher alkenyl moiety (preferably represented by the formula —$R^2(CH_2)_aCH=CH_2$ wherein $R^2$ is —$(CH_2)_b$— or —$(CH_2)_cCH=CH$— and a is 1, 2, or 3, b is 0, 3, or 6, and c is 3, 4, or 5), a cycloalkyl moiety (preferably having 6 to 12 carbon atoms and may be substituted with, for example, alkyl, fluoroalkyl, or vinyl groups), or an aryl moiety (preferably having 6 to 20 carbon atoms and may be substituted with, for example, alkyl, cycloalkyl, fluoroalkyl or vinyl groups), or R is a fluorine-containing group (including those described in U.S. Pat. No. 5,236,997 (Fijiki), perfluoroalkyl groups as described in U.S. Pat. No. 5,028,679 (Terae et al.), or perfluoroether-containing groups, as described in U.S. Pat. Nos. 4,900,474 (Terae et al.) and 5,118,775 (Inomata et al.)); preferably at least 50% of the R moieties are methyl moieties with the balance being monovalent alkyl or substituted alkyl moieties having 1 to 12 carbon atoms, alkenylene moieties, phenyl moieties, or substituted phenyl moieties;

each Z is independently a polyvalent moiety that is an arylene moiety, an aralkylene moiety, an alkylene moiety, or a cycloalkylene moiety (each of which preferably has 6 to 20 carbon atoms); preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene, and mixtures thereof;

each Y is independently a polyvalent moiety that independently is an alkylene moiety (preferably having 1 to 10 carbon atoms), an aralkylene moiety or an arylene moiety (each of which preferably has 6 to 20 carbon atoms);

each E is independently hydrogen, an alkyl moiety of 1 to 10 carbon atoms, phenyl, or a moiety that completes a ring structure including Y to form a heterocycle;

each A is independently oxygen or —N(G)—, wherein each G is independently hydrogen, an alkyl moiety of 1 to 10 carbon atoms, phenyl, or a moiety that completes a ring structure including B to form a heterocycle;

B is an alkylene, aralkylene, cycloalkylene, phenylene, polyalkylene, polyalkylene oxide (including for example, polyethylene oxide, polypropylene oxide, polytetramethylene oxide, polycaprolactone, polyethylene adipate), copolymers, or mixtures thereof, or a moiety completing a ring structure including A to form a heterocycle;

m is a number that is 0 to about 1000, preferably 0 to about 25;

n is a number that is equal to or greater than 1 (preferably, n is greater than 8); and p is a number that is about 5 or larger, preferably, about 15 to about 2000, more preferably, about 70 to about 1500, and most preferably about 150 to about 1500.

In the use of polyisocyanates when Z is a moiety having a functionality greater than 2 and/or polyamines when B is a moiety having a functionality greater than 2, the structure of Formula I will be modified to reflect branching at the polymer backbone.

Reactive Components of the Polydiorganosiloxane Polyurea Copolymers

Different isocyanates in the reaction will modify the properties of the polydiorganosiloxane polyurea copolymers in varying ways. Diisocyanates useful in the process of the present invention can be represented by the following (Formula II):

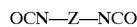

Any diisocyanate that can react with a polyamine, and in particular with polydiorganosiloxane diamine of Formula III, below, can be used in the present invention. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl (o-dianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diisocyanatododecane, 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, and cyclohexylene-1,4-diisocyanate and mixtures thereof.

Preferred diisocyanates include 2,6-toluene diisocyanate, methylenediphenylene-4,4'-diisocyanate, polycarbodiimide-modified methylenediphenyl diisocyanate, 4,4'-diisocyanato-3,3'-dimethoxybiphenyl(o-dianisidine diisocyanate), tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 1,6-diisocyanatohexane, 2,2,4-trimethylhexyl diisocyanate, and cyclohexylene-1,4-diisocyanate.

Polydiorganosiloxane polyamines useful in the process of the present invention are preferably diamines, which can be represented by the following (Formula III):

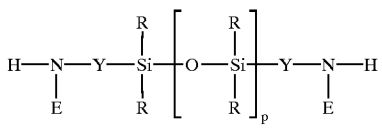

wherein each of R, Y, E, and p are defined as above. Generally, the number average molecular weight of the polydiorganosiloxane polyamines useful in the present invention is greater than about 700.

Preferred polydiorganosiloxane diamines (also referred to as silicone diamines) useful in the present invention are any which fall within Formula III above and including those having number average molecular weights in the range of about 5000 to about 150,000. Polydiorganosiloxane diamines are disclosed, for example, in U.S. Pat. Nos. 3,890,269 (Martin), 4,661,577 (JoLane et al.), 5,026,890 (Webb et al.), 5,214,119 (Leir et al.), 5,276,122 (Aoki et al.), 5,461,134 (Leir et al.), and 5,512,650 (Leir et al.).

Polydiorganosiloxane polyamines are commercially available from, for example, Shin-Etsu Silicones of America, Inc., Akron, Ohio, and Hüls America, Inc., Pitscataway, N.J. Preferred are substantially pure polydiorganosiloxane diamines prepared as disclosed in U.S. Pat. No. 5,214,119 (Leir et al.). The polydiorganosiloxane diamines having such high purity are prepared from the reaction of cyclic organosilanes and bis(aminoalkyl) disiloxanes utilizing an anhydrous amino alkyl functional silanolate catalyst such as tetramethylammonium-3-aminopropyldimethyl silanolate, preferably in an amount less than 0.15 weight percent based on the weight of the total amount of cyclic organosiloxane with the reaction run in two stages. Particularly preferred polydiorganosiloxane diamines are prepared using cesium and rubidium catalysts and are disclosed in U.S. Pat. No. 5,512,650 (Leir et al.).

Examples of polydiorganosiloxane polyamines useful in the present invention include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and copolymers and mixtures thereof.

The polydiorganosiloxane polyamine component employed to prepare polydiorganosiloxane polyurea segmented copolymers of this invention provides a means of adjusting the modulus of elasticity of the resultant copolymer. In general, high molecular weight polydiorganosiloxane polyamines provide copolymers of lower modulus, whereas low molecular weight polydiorganosiloxane polyamines provide polydiorganosiloxane polyurea segmented copolymers of higher modulus.

When polydiorganosiloxane polyurea segmented copolymer compositions contain an optional organic polyamine, this optional component provides yet another means of modifying the modulus of elasticity of copolymers of this invention. The concentration of organic polyamine as well as the type and molecular weight of the organic polyamine determine how it influences the modulus of polydiorganosiloxane polyurea segmented copolymers containing this component.

Examples of organic polyamines useful in the present invention include, but are not limited to, polyoxyalkylene diamine (such as D-230, D-400, D-2000, D-4000, DU-700, ED-2001 and EDR-148 all available from Huntsman Chemical Corp., Salt Lake City, Utah), polyoxyalkylene triamine (such as T-3000 and T-5000, both available from Huntsman), polyalkylene diamines (such as DYTEK A and DYTEK EP both available from DuPont, Wilmington, Del.), 1,4-bis(3-aminopropyl)piperazine and 3,3'-diamino-N-methyl-dipropylamine (both available from Aldrich Chemical Co., Milwaukee, Wis.), and mixtures thereof.

The nature of the isocyanate residue in the polydiorganosiloxane polyurea copolymer influences stiffness and flow properties, and also affects the properties of the mixtures. Isocyanate residues resulting from diisocyanates that form crystallizable ureas, such as tetramethyl-m-xylylene diisocyanate, 1,12-dodecane diisocyanate, and dianisidine diisocyanate, provide mixtures that can be stiffer, if sufficient polydiorganosiloxane polyurea copolymer is used, than those prepared from methylenedicyclohexylene-4,4'-diisocyanate, 3-isocyanatomethyl-3,5,5-trimethylcyclohexyl isocyanate, and m-xylylene diisocyanate.

Crosslinking agents, if desired may be used, for example Si—H-containing agents may be used to crosslink curable polydiorganosiloxane polyurea copolymers or photoinitiators can be used for free-radically curable polydiorganosiloxane urea copolymers. Additional curatives may also be present such as hydrosilation curatives, peroxide curatives, and photocuratives, such as triazines. When used, the amounts of such components are those that are suitable for the purpose intended and are typically used at a concentration of from about 0.1% to about 5% by weight of the total weight of the polymerizable composition. Crosslinking can also be carried out using electron beam radiation if desired.

Preparation of the Polydiorganosiloxane Polyurea Copolymers

The polydiorganosiloxane polyurea copolymers can be made by any of a variety of known methods, including solvent-based and solvent-free methods. Examples of solvent-based processes include Tyagi et al., "Segmented Organosiloxane Copolymers: 2. Thermal and Mechanical Properties of Siloxane urea Copolymers," *Polymer*, Vol. 25, December, 1984 and U.S. Pat. No. 5,214,119 (Leir et al.). Suitable solvents are organic solvents that are unreactive with the polyisocyanates and that maintain the reactants and products completely in solution throughout the polymerization reaction. Typical organic solvents include those that have a combination of polar and nonpolar character, or mixtures of polar solvents with nonpolar solvents can be used. Preferred organic solvents include polar aprotic solvents, chlorinated solvents, ethers, aromatic hydrocarbons, aliphatic hydrocarbons, and alcohols. Examples include heptane, toluene, xylene, methyl ethyl ketone, 2-propanol, tert-butanol, tetrahydrofuran, isoamyl alcohol, chloroform, dichloromethane, dimethyl formamide, and the like, and combinations thereof. Examples of solvent-free processes include International Publication Nos. WO 96/34029, WO 96/35458, and WO 98/17726, all to the 3M Co., St. Paul, Minn.

Silicone Tackifying Resins

Silicone tackifying resins are added to the polydiorganosiloxane polyurea copolymer to provide or enhance the pressure sensitive adhesive properties of the polymer. The silicone tackifying resin can play an important role in determining the physical properties of the polydiorganosiloxane polyurea copolymer of the present invention. For example, as silicone tackifying resin content is increased from low to high concentration, the glassy to rubbery transition of the polydiorganosiloxane polyurea copolymer occurs at increasingly higher temperatures. One need not be limited to a single silicone tackifying resin as it may be beneficial to employ a combination of resins in a single composition to achieve desired performance.

The silicone tackifying resins useful in the present invention include those resins composed of the following structural units M ($R'_3SiO_{1/2}$ units), D ($R'_2SiO_{2/2}$ units), T ($R'SiO_{3/2}$ units), and Q ($SiO_{4/2}$ units), and combinations thereof. Typical examples include MQ silicone tackifying resins, MQD silicone tackifying resins, and MQT silicone tackifying resins. These preferably have a number average molecular weight of about 100 to about 50,000, more preferably about 500 to about 15,000 and generally have methyl substituents.

MQ silicone tackifying resins are copolymeric silicone resins having $R'_3SiO_{1/2}$ units ("M" units) and $SiO_{4/2}$ units ("Q"units), where the M units are bonded to the Q units, each of which is bonded to at least one other Q unit. Some of the $SiO_{4/2}$ units ("Q"units) are bonded to hydroxyl radicals resulting in $HOSiO_{3/2}$ units ("$T^{OH}$" units), thereby accounting for the silicon-bonded hydroxyl content of the silicone tackifying resin, and some are bonded only to other $SiO_{4/2}$ units.

Such resins are described in, for example, *Encyclopedia of Polymer Science and Engineering*, Vol. 15, John Wiley & Sons, New York, (1989), pp. 265–270, and U.S. Pat. Nos. 2,676,182 (Daudt et al.), 3,627,851 (Brady), 3,772,247 (Flannigan), and 5,248,739 (Schmidt et al.).

Suitable MQ silicone tackifying resins can be prepared by any method providing said method provides a soluble resin consisting essentially of $R'_3SiO_{1/2}$ siloxane units and $SiO_{4/2}$ siloxane units which meet the requirements of the present invention. Such MQ resins are typically prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). The modified process of Daudt et al. includes limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is preferably stabilized with an alcohol, such as 2-propanol, and capped with $R_3SiO_{1/2}$ siloxane units as soon as possible after being neutralized. It is important to note that the level of silicon bonded hydroxyl groups on the MQ resin may be reduced, preferably to less than about 1.5% by weight, more preferably to no greater than about 1.2 wt-%, even more preferably to no greater than about 1.0 wt-%, and most preferably to no greater than 0.8 wt-%. This may be accomplished, for example, by reacting hexamethyldisilazane with the silicone tackifying resin. Such a reaction may be catalyzed, for example, with trifluoroacetic acid. Alternatively, trimethylchlorosilane or trimethylsilylacetamide may be reacted with the silicone tackifying resin, a catalyst not being necessary in this case. Such resins are generally prepared in solvent.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl groups of the $R'_2SiO_{2/2}$ units ("D" units) can be replaced with vinyl ($CH_2=CH-$) groups ("$D^{Vi}$" units).

MQT silicone tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler), and Japanese Kokai HE 2-36234.

Suitable low silanol content silicone tackifying resins are commercially available from sources such as Dow Corning, Midland, Mich., General Electric Silicones Waterford, N.Y. and Rhodia Silicones, Rock Hill, S.C. Examples are disclosed in U.S. Pat. No. 5,082,706 (Tangney). Such resins are generally supplied in organic solvent and may be employed in the adhesives of the present invention as received. Also useful in polydiorganosiloxane polyurea copolymers of the present invention are blends of two or more silicone resins.

The amount of a tackifying resin (includes MQ resin, MQT, and MQD) needed will determine the desired levels of release and peel forces of the PSA compositions. Preferably, at least about 30 weight parts, more preferably, at least about 40 weight parts, even more preferably, at least about 50 weight parts, even more preferably, at least about 55 weight parts, and most preferably, at least about 58 weight parts, is used to achieve the desired balance of release force, peel, and shear performance, when the total weight parts (i.e., parts by weight) of tackifying resin plus polydiorganosiloxane polyurea copolymers equals 100 parts (thus, these weight parts are in percentages). Preferably, no greater than about 70 weight parts, and more preferably, no greater than about 65 weight parts tackifying resin, is used to achieve the desired balance of release force, peel, and shear performance, when the total weight parts (i.e., parts by weight) of tackifying resin plus polydiorganosiloxane polyurea copolymers equals 100 parts (thus, these weight parts are in percentages based on the weight of the silicone tackifying resin and the polydiorganosiloxane polyurea copolymer).

Preferred silicone tackifying resins include a relatively high M/Q ratio and low silanol content resins. Preferably, the silicone tackifying resins contain less than about 1.5% by weight (wt-%) silanol (Si—OH) content (i.e., hydroxyl content as silanol), based on the total weight of the silicone tackifying resin. More preferably, the silanol content is no greater than about 1.2 wt-%, even more preferably, no greater than about 1.0 wt-%, and most preferably, no greater than about 0.8 wt-%. The silicone tackifying resins preferably have an M/Q ratio of at least about 0.7:1.0, and more preferably at least about 0.8:1.0. The use of resins low in SiOH content with M/Q ratios as described above provide PSAs of the invention having improved peel adhesion, tack, adhesive stability upon aging, and liner release stability, relative to PSAs based on silicone tackifying resins having higher amounts of SiOH functional groups and/or lower M/Q ratios.

Although the inventors do not wish to be bound by theory it is believed that the relatively high M/Q ratio improves the compatibility between the silicone tackifying resin and the polydiorganosiloxane polyurea copolymer, resulting in greater adhesion to a variety of substrates, a wider range of acceptable silicone resin loadings, and a reduced potential for changes in the pressure sensitive adhesive with aging. It is further believed that the relatively low Si—OH functional group content stabilizes the composition by limiting the potential for intercondensation of silicone resin functional groups that can lead to increased resin molecular weight, thus detrimentally reducing compatibility between the polydiorganosiloxane polyurea copolymer and the silicone tackifying resin, and increasing the glass transition temperature of the pressure sensitive adhesive to a point where it no longer exhibits pressure sensitive tack at room temperature. Furthermore, relatively low functional group content reduces the potential for reaction between these groups and residual complementary functionality in a silicone release coating of a release liner, when used, thereby reducing the potential of release forces increasing over time.

Other Optional Additives

The pressure sensitive adhesives of the present invention can optionally include other additives to provide desired properties. For example, dyes or pigments may be added as colorant; electrically and/or thermally conductive compounds may be added to make an adhesive electrically and/or thermally conductive or antistatic; antioxidants and bacteriostatic agents may be added; and UV light stabilizers and absorbers, such as hindered amine light stabilizers (HALS), may be added to stabilize the PSA against UV degradation and to block certain UV wavelengths from passing through the article. Other additives include adhesion promoters, fillers, tack enhancers, glass or ceramic microbubbles, expanded and unexpanded polymeric microspheres, blowing agents, polymers, and other property modifiers, such as clays, flame retardants, and compatibilizers. These additives can be used in various combinations in amounts of about 0.05 weight percent to about 25 weight percent, based on the total weight of the polydiorganosiloxane polyurea composition.

Certain pressure sensitive adhesives of the present invention can also include processing aids, such as plasticizers, for enhancement of tack if desired as described in U.S. patent application Ser. No. 10/028,553, filed on Dec. 18, 2001.

Processing aids, such as plasticizers, are beneficially added to solvent-based adhesive compositions (i.e., those coated out of an organic solvent) of the present invention to ensure generally uniform distribution of the polydiorganosiloxane polyurea copolymer and the silicone tackifying resin throughout the thickness of the adhesive layer. High concentrations of silicone tackifying resin can be advantageously employed to increase peel adhesion and to limit the level of adhesion build when the adhesive is disposed and aged on a fluorosilicone release liner. However, when tackifying resin concentrations of 55 wt-% (based on the silicone tackifying resin and the polydiorganosiloxane polyurea components) or greater are used in such an adhesive and the adhesive is applied from solvent to an appropriate substrate, such as a release liner, a significant difference in tack occurs between the air interface and the liner interface of the adhesive. Specifically, the air interface typically exhibits significantly higher tack than the adhesive face in contact with the release liner. This loss in tack on the liner side of the adhesive is believed due to a concentration gradient in silicone tackifying resin that occurs upon drying the adhesive, where the adhesive air interface is depleted in tackifying resin and liner side of the adhesive is enriched in tackifying resin. The increase in silicone tackifying resin concentration on the liner side of the PSA and consequent loss in tack may be minimized or eliminated by employing a miscible processing aid, such as a plasticizer, in the adhesive composition. Although shear holding power may be reduced with the use of such processing aids, surprisingly, they provide a good balance of tack, peel, and shear holding power.

Suitable processing aids, which may be transient, permanent, or a combination thereof, are those that are generally miscible (i.e., form generally clear mixture) with the components of the pressure sensitive adhesive, particularly the silicone tackifying resin and the polydiorganosiloxane, and do not adversely effect the performance of the adhesive. Typically, such processing aids include hydrocarbons, which may or may not have functional groups, heteroatoms, etc., glycol ethers, esters, alcohols, ester alcohols, ketones, amines, and organic substituted silicone oils. Examples include alkanes, alkenes, acrylates, esters, oils (e.g., aromatic oils, mineral oils, naphthenic oils), and organosiloxanes. Various combinations of such processing aids can be used if desired.

The processing aids can be either transient (i.e., volatile) or permanent. Certain alkanes are transient, whereas certain alkenes, acrylates, esters, oils (e.g., aromatic oils, mineral oils, naphthenic oils), and organosiloxanes are permanent. The term transient indicates that substantially none of the processing aid remains in the adhesive composition after coating out of a solvent and removal of the solvent. The term permanent indicates that some or all of the processing aid remains in the adhesive composition after coating out of a solvent and removal of the solvent. Such permanent processing aids are referred to herein as plasticizers.

One or more processing aids (preferably permanent processing aids, i.e., plasticizers) can be used in a pressure sensitive adhesive of the present invention. Preferably, the total amount of processing aid is initially present in an amount of at least about 0.5 wt-%, and more preferably, at least about 1 wt-%, based on the total weight of the pressure sensitive adhesive composition. Preferably, the total amount of processing aid is initially present in an amount of no greater than about 10 wt-%, more preferably, no greater than about 6 wt-%, and most preferably, no greater than about 5 wt-%, based on the total weight of the composition.

Preparation and Use of Adhesive Articles

The adhesive composition can be applied to appropriate release liners or tape backings by a wide range of processes, including, solution coating, solution spraying, hot melt coating, extrusion, coextrusion, lamination, pattern coating, etc., to make adhesive laminates, preferably at a coating weight of about 0.02 grams/154.8 cm$^2$ to about 2.4 grams/154.8 cm$^2$. Typically, it is applied to a substrate, such as polyethylene terephthalate coated with a fluorosilicone release material (such as that disclosed in U.S. Pat. No. 5,082,706 (Tangney) and commercially available from Loparex, Inc., Bedford Park, Ill.) to form an adhesive/release liner laminate. The liner can have a microstructure on its surface that is imparted to the adhesive to form a microstructure on the adhesive surface. The adhesive transfer tape can be used as is or can be applied, e.g., laminated, to at least one side of a desired substrate, such as biaxially oriented polyethylene or high density polyethylene, to form an adhesive tape. When laminated onto only one side of a substrate, e.g., a backing film or a foam substrate, a single sided tape can be produced. When laminated onto both sides of a substrate, e.g., a film or a foam, a double-sided tape can be produced. Additionally, in the case of a double-sided tape, the tape can have chemically or rheologically the same or different adhesive on its sides, e.g., one adhesive may be a pressure sensitive adhesive, the other, a heat activated adhesive, or one adhesive is silicone based and the other is acrylic based.

Suitable backings for use in the adhesive articles of the present invention can include a wide range of substrate materials, examples being polymer films such as polyimide, polyethylene, polyethylene terephthalate (PET), biaxially oriented polypropylene (BOPP), and metallocene-polymerized poly(alpha-olefin) copolymers, cloth, paper, treated paper, woven and nonwoven scrims, netting, mesh, and the like. A preferred backing is a foam, such as an acrylic, polyethylene, polyurethane, rubber, or silicone foam. A particularly preferred foam is an acrylic foam such as that disclosed in U.S. Pat. No. 4,415,615 (Esmay et al.) and in U.S. Pat. No. 6,103,152 (Gehlsen et al.).

The adhesive articles of the invention are tapes or sheets that may contain additional layers such as primers, barrier coatings, metal and/or reflective layers, tie layers, and combinations thereof. Priming of the layer(s) may include a priming step such as chemical or mechanical priming. An example of a useful chemical primer is a solvent solution of acrylonitrile butadiene rubber, epoxy resin, and polyamide resin.

Other suitable chemical primers are described in U.S. patent application Ser. No. 10/025,130, filed on Dec. 18, 2001. These include a polydiorganosiloxane polyurea copolymer similar to the adhesives of the present invention but including electron rich groups selected from the group consisting of tertiary amine groups (including aliphatic, cycloaliphatic (e.g., piperazine), and aromatic tertiary amines), pyridine groups, and combinations thereof. The tertiary amine groups can be incorporated using a polyfunctional chain extender (preferably, an organic polyamine such as 1,4-bis(3-aminopropyl)piperazine and 3,3'-diamino-N-methyl-dipropylamine) including electron rich groups. Such chain extenders are typically used in an amount of at least about 0.01 percent by weight (wt-%) and reacted with a polyisocyanate and a polydiorganosiloxane polyamine to form a polydiorganosiloxane polyurea copolymer. These primers are particularly well suited for substrates that include acid functional groups.

The adhesive articles of the invention may be exposed to post processing steps such as die cutting, heating to cause expansion of the article, e.g., foam-in-place, and the like. The adhesive articles of the invention have utility for damping vibration, sealing, fastening system/means for reclosable fasteners, assembling panels, and attaching abrasive pads, body side molding, flexographic plates, muntin bars, ceiling panels, spacers, and signage.

When the article is a foam tape or sheet, the article can be used as a spacer and also provides a seal as well as an adhesive bond.

Objects and advantages of this invention are further illustrated by the following examples, but the particular materials and amounts thereof recited in these examples, as well as other conditions and details, should not be construed to unduly limit this invention. All amounts listed in the tape preparations and examples are by weight unless otherwise specified.

Test Methods
Characterization of MQ Resin

Molecular weight of the soluble MQ resins was measured by gel-permeation chromatography (GPC). Samples were prepared by adding 10 milliliters (ml) of tetrahydrofuran to approximately 25.0 milligrams (mg) of MQ resin sample and mixing until dissolved. The solution was filtered using a 0.2-micrometer syringe filter, and 150 microliters of solution was injected into a two column set of Jordi 500A columns (available from Jordi Associates Inc., Bellingham, Mass.), having lengths of 50 centimeters (cm) and 25 cm, in combination with a Waters 2690 Separation Module (available from Waters Corporation, Milford, Mass.). The 2690 Separation Module operated at room temperature, using tetrahydrofuran as the eluant, flowing at a rate of 1.0 milliliter/minute (ml/min). Changes in concentration were detected by a Varex ELSD evaporative light scattering detector (available from Altech Corporation, Deerfield, Ill.). The molecular weight calculations were based upon a calibration made of narrow dispersity polystyrene standards ranging in molecular weight from 266 to 64,500. The actual calculations were completed with Caliber software (available from Polymer Laboratories, Inc., Amherst, Mass.).

The MQ resins were analyzed using $^{29}$Si NMR spectroscopy and the mole percentages of M, Q, and $T^{OH}$ structural units were measured. From these values the mole ratio of M/Q and the weight percent silanol (SiOH) was determined for each resin. The mole ratio of M/Q structural units was calculated by dividing the number of M structural units by the sum of the Q and $T^{OH}$ structural units. The weight percent SiOH was calculated by multiplying the weight fraction of $T^{OH}$ structural units in the resin composition by the weight fraction of hydroxyl/$T^{OH}$ structural unit.

Transfer Tape and Single-Coated Tape Preparation

Adhesive solutions were knife coated on 50.8-micrometer thick fluorosilicone-coated PET film release liner (available as REXAM No. 20987 from Loparex Inc., Bedford Park, Ill.) and dried in a forced air oven for 5 minutes at 70° C. to provide a transfer tape having a thickness of 50.8 micrometers on release liner.

Laminating this pressure sensitive adhesive transfer tape, which had been held at room temperature (about 22° C.) for one week or aged for one week at 70° C. followed by 1 day at room temperature (about 22° C.), to a film of polyethylene terephthalate (PET), having a thickness of 38 micrometers, provided a PET backed single-coated tape construction.

180° Peel Adhesion of Single-Coated Tapes

The performance of single-coated tapes was evaluated by measuring their peel adhesion to various surfaces. A strip of test tape measuring 2.54 cm wide×12.7 cm long was applied to high density polyethylene (HDPE) or stainless steel (SS) test panels using two passes (one each direction) of a 2.0-kilogram (kg) rubber roller at a speed of 30.5 centimeters/minute (cm/min), allowed to dwell for 1 minute at room temperature (about 22° C.), and then pulled using a Slip/Peel Tester Model 3M90 (available from Instrumentors Inc., Strongsville, Ohio) at a removal angle of 180° and a platen speed of 30.5 cm/min.

The average force required to remove the tape from the panel was recorded in Newtons/decimeter (N/dm). The values reported were the average of two replicates. Initial tests were performed approximately one week after coating the adhesive on the liner (i.e., transfer tape); the aged tests were performed after aging the adhesive on the liner for one week at 70° C. followed by 1 day at room temperature (about 22° C.).

90° Peel Adhesion of Acrylic Foam Tapes

Foam tapes bearing adhesive compositions of the invention were evaluated by measuring their peel adhesion to various surfaces. The foam tapes were prepared as described in the Examples.

A strip of foam tape measuring 1.25 cm wide×12.7 cm long was applied to a polypropylene (PP), high density polyethylene (HDPE), or stainless steel (SS) test panel, and a 0.13-mm thick anodized aluminum foil was laminated to the exposed adhesive layer. The aluminum foil was larger in size than the foam tape so that there was a portion of the aluminum foil that was not laminated to the adhesive layer. The assembly was then rolled down using two passes (one each direction) of a 6.8-kg steel roller at a rate of 30.5 cm/min and allowed to dwell for 72 hours at room temperature (about 22° C.).

The foam tape was peeled from the test panel by pulling the aluminum strip at an angle of 90° in an Instron Model 4465 tensile tester (available from Instron Corporation, Canton, Mass.) at a crosshead rate of 30.5 cm/min.

The average force required to remove the foam tape from the panel was recorded in N/dm. Initial tests were performed approximately one week after coating the adhesive on the liner (i.e., the transfer tape); aged tests were performed after aging the adhesive on the liner (i.e., the transfer tape) one week at 70° C. followed by 1 day at room temperature (about 22° C.) prior to preparing the foam tape and applying the foam tape to test panel. The values reported were the average of two replicates.

Liner Release

Test tapes made with the adhesives of the instant invention were characterized by measuring the force required to remove a fluorosilicone coated release liner (REXAM No. 20987, from Loparex Inc., Bedford Park, Ill.) from the adhesive, both initially and after heat aging.

A strip of adhesive transfer tape measuring 2.54 cm wide×25.4 cm long was applied to a metal platen by rolling it down using one pass of a 2.0-kg rubber roller at a rate of 2.3 meters per minute (m/min). The release liner was removed by pulling at an angle of 180° and a platen speed of 2.3 m/min using a Slip/Peel Tester Model 3M90 (available from Instrumentors Inc., Strongsville, Ohio).

The average force required to remove the release liner from the adhesive is recorded in grams of force per inch width of adhesive (g/in) and converted to Newtons/decimeter (N/dm). Initial test were performed approximately one week after coating the adhesive; aged tests were performed after aging the adhesive sample for one week at 70° C. followed by 1 day at room temperature (about 22° C.). The values reported were the average of two replicates.

Materials Used in the Examples

MQ Resin A—MQ resin consisting of M, Q, and $T^{OH}$ structural units, having an M/Q ratio of 1.2, SiOH content of 2.0%, number average molecular weight (Mn)=1710, and weight average molecular weight (Mw)=2260, 70.9% solids by weight in xylene.

MQ Resin B—MQ Resin A treated to reduce the silanol content and consisting of M, Q, and $T^{OH}$ structural units, having an M/Q ratio of 1.4, SiOH content of 0.6%, Mn=2030, and Mw=2800, 71.2% solids by weight in xylene.

MQ Resin C—MQ resin consisting of M, Q, and $T^{OH}$ structural units, having an M/Q ratio of 1.0, SiOH content of 2.5%, Mn=2070, and Mw=3160, 73.5% solids by weight in xylene.

MQ Resin D—MQ Resin C treated to reduce the silanol content and consisting of M, Q, and $T^{OH}$ structural units, having an M/Q ratio of 1.2, SiOH content of 0.5%, Mn=2570, and Mw=4100, 74.1% solids by weight in xylene.

MQ Resin E—MQ resin consisting of M, Q, and $T^{OH}$ structural units, having an M/Q ratio of 0.9, SiOH content of 2.6%, Mn=2270, and Mw=3950, 72.1% solids by weight in xylene.

MQ Resin F—MQ Resin E treated to reduce the silanol content and consisting of M, Q, and $T^{OH}$ structural units, having an M/Q ratio of 1.2, SiOH content of 0.7%, Mn=2730, and Mw=4410, 62.3% solids by weight in xylene.

MQ Resin G—MQ resin consisting of M, Q, and $T^{OH}$ structural units, having an M/Q ratio of 0.9, SiOH content of 2.3%, and Mn=2590, Mw=4830, 77.0% solids by weight in xylene.

MQ Resin H—MQ Resin G treated to reduce the silanol content and consisting of M, Q, and $T^{OH}$ structural units, having an M/Q ratio of 1.2, SiOH content of 0.4%, Mn=3040, and Mw=5280, 60.5% solids by weight in xylene.

MQ Resin I—MQ resin consisting of M, Q, and $T^{OH}$ structural units, having an M/Q ratio of 0.9, SiOH content of 1.6%, Mn=2130, and Mw=3350, 60.8% solids by weight in toluene.

MQ Resin J—MQ resin treated to reduce the silanol content and consisting of M, Q, and $T^{OH}$ structural units, having an M/Q ratio of 1.2, SiOH content of 0.8%, Mn=2820, and Mw=4600, 63.4% solids by weight in xylene.

MQ Resin K—MQ resin consisting of M, $D^{Vi}$, Q, and $T^{OH}$ structural units, present in mole percentages of 49.5, 7.7, 40.9, and 1.9, respectively, and having an SiOH content of 0.5%, Mn=3300, and Mw=5260, 59.5% solids by weight in xylene.

MQ Resin L—MQ resin consisting of M, Q, and $T^{OH}$ structural units, having an M/Q ratio of 1.2, SiOH content of 0.8%, Mn=3200, and Mw=5010, 67.2% solids by weight in xylene.

DESMODUR W—methylene bis(4-cyclohexylisocyanate) (available from Bayer, Pittsburgh, Pa.).

DYTEK A—2-methyl-1,5-pentanediamine (available from E. I. duPont de Nemours, Wilmington, Del.).

14.4K PDMS diamine—an approximately 14,400 number average molecular weight polydimethylsiloxane diamine prepared as described in Example 2 of U.S. Pat. No. 5,461,134.

32.3K PDMS diamine—an approximately 32,300 number average molecular weight polydimethylsiloxane diamine prepared as described in Example 2 of U.S. Pat. No. 5,461,134.

N,N-bis(3-aminopropyl)methylamine (available as Catalogue No. B0821 from TCI America, Portland, Oreg.).

BRITOL 20 USP—mineral oil (available from C K Witco Corporation, Petrolia, Pa.).

CYASORB UV-3581—hindered amine light stabilizer (available from Cytec Industries, West Paterson, N.J.).

CYASORB UV-1084—light stabilizer (available from Cytec Industries, West Paterson, N.J.).

TINUVIN 328—UV absorber (available from Ciba Specialty Chemicals Tarrytown, N.Y.).

TINUVIN 292—hindered amine light stabilizer (available from Ciba Specialty Chemicals Tarrytown, N.Y.).

IRGANOX 1076—antioxidant (available from Ciba Specialty Chemicals, Tarrytown, N.Y.).

CLOISITE 20A—clay (available from Southern Clay Products, Gonzales, Tex.).

SILGRIP PSA529—silicone pressure sensitive adhesive (available from General Electric Silicones, Waterford, N.Y.).

SILQUEST A-1100—amine-functional silane (available from C K Witco Corporation, Petrolia, Pa.).

NIPOL 1002—acrylonitrile butadiene rubber (available from Zeon Chemicals, Louisville, Ky.).

EPON 828—epoxy resin (available from Resolution Performance Products, Houston, Tex.).

VERSAMID 115—polyamide resin (available from Cognis, Cincinnati, Ohio).

Preparation of Silicone Polyurea Polymer

A silicone polyurea elastomer was prepared by charging 98 parts 32.3K PDMS diamine, 0.35 part DYTEK A, 209.7 parts toluene, and 89.9 parts 2-propanol to a reaction vessel fitted with mechanical stirrer, heating mantle, thermometer, reflux condenser and nitrogen atmosphere.

The reaction vessel was sealed and heated to 110° C. for 30 minutes, cooled to 80° C. and degassed by sweeping the headspace of the reaction vessel with a stream of nitrogen gas until the vessel temperature reached 50° C. at which time the reactor was again sealed. With the reaction vessel maintained at 50° C., 1.48 parts DESMODUR W was charged to the vessel and allowed to react for 2 hours. A second charge of 0.039 part DESMODUR W was added to complete the reaction and provide Silicone Polyurea Polymer at 25% solids by weight.

Preparation of Primer A

A 25% solids by weight solution was prepared from 100 parts SILGRIP PSA529, 3.3 parts SILQUEST A-1100, and toluene to provide Primer A.

Preparation of Primer B

A silicone polyurea elastomer was prepared by charging 110 parts 14.4K PDMS diamine, 2.77 parts N,N-bis(3-aminopropyl)methylamine, 335 parts toluene, and 153 parts 2-propanol to a reaction vessel and mixing well at room temperature (about 22° C.). Twelve (12.0) parts DESMO-DUR W was added and the reactants agitated for two hours. An additional 2.77 parts N,N-bis(3-aminopropyl)methylamine was added and allowed to agitate an additional 16 hours to complete the synthesis of the silicone elastomer polyurea in solution.

Separately, a clay solution was made by dispersing 5 parts CLOISITE 20A into a solution of 80.75 parts toluene and 14.25 parts 2-propanol under moderate shear at room temperature (about 22° C.).

A sample (425 parts) of silicone polyurea elastomer solution prepared above and 300 parts clay solution were mixed together and agitated for 16 hours to provide a homogeneous solution. To this solution was added 1.0 part TINUVIN 328, 1.0 part TINUVIN 292, and 0.25 part IRGANOX 1076 to provide Primer B.

Preparation of Primer C

An approximately 100 g piece of NIPOL 1002 rubber was milled for 10 minutes between two 30.5 cm (12 inches) wide by 15.2 cm (6 inches) diameter steel cylinder rollers with a gap of 0.25 mm (0.010 inches) turning at 20 RPM. A milled rubber solution was prepared by dissolving 60 parts of milled NIPOL 1002 into a mixture of 323 parts toluene and 17 parts 2-propanol (IPA) in a glass jar on an end-over-end tumbler for at least 24 hours.

A 10% solids content by weight solution was then prepared from 149.3 parts milled rubber solution, 6.4 parts VERSAMID 115, 3.2 parts EPON 828, 153.0 parts toluene, and 8.05 parts IPA to provide Primer C.

EXAMPLES

Examples 1–4 and Comparative Examples 1–4

Pressure sensitive adhesive compositions were prepared by combining Silicone Polyurea Polymer prepared above, MQ resin solution, toluene, and 2-propanol (IPA), in the amounts (in parts by weight) recited in Table 1, and mixing well at room temperature (about 22° C.) to provide adhesive solutions. All examples contained 58% by weight MQ resin based on the total weight of MQ resin and polymer.

Transfer tapes and single-coated tapes were prepared from these adhesive solutions, as described above in Transfer Tape and Single-Coated Tape Preparation, and tested for initial and aged peel adhesion and liner release according to the test methods Peel Adhesion of Single-Coated Tapes and Liner Release described hereinabove. The results are reported in Tables 2 and 3.

TABLE 1

| Example No. | Amount Silicone Polyurea Polymer Solution | MQ Resin | Amount MQ Resin Solution | Amount Toluene | Amount IPA |
|---|---|---|---|---|---|
| Comp 1 | 32.2 | A | 14.3 | 48.3 | 0.4 |
| 1 | 28.9 | B | 13.9 | 41.3 | 0.4 |
| Comp 2 | 27.9 | C | 13.0 | 41.3 | 0.4 |
| 2 | 33.2 | D | 15.4 | 49.3 | 0.4 |
| Comp 3 | 28.3 | E | 13.4 | 41.9 | 0.3 |
| 3 | 27.5 | F | 15.1 | 38.4 | 0.3 |
| Comp 4 | 29.1 | G | 14.2 | 42.8 | 0.4 |
| 4 | 29.3 | H | 16.6 | 40.5 | 0.3 |

TABLE 2

| Example No. | Residual Silanol Content (wt-%) | MQ Resin Mw (GPC) | Peel Adhesion (N/dm) HDPE Initial | Peel Adhesion (N/dm) HDPE Aged | Peel Adhesion (N/dm) SS Initial | Peel Adhesion (N/dm) SS Aged |
|---|---|---|---|---|---|---|
| Comp 1 | 2.0 | 2260 | 24.1 | 20.5 | 26.4 | 23.9 |
| 1 | 0.6 | 2800 | 70.8 | 31.4 | 83.3 | 35.0 |
| Comp 2 | 2.5 | 3160 | 36.7 | 25.9 | 51.2 | 28.6 |
| 2 | 0.5 | 4100 | 76.0 | 45.5 | 90.0 | 54.1 |
| Comp 3 | 2.6 | 3950 | 42.7 | 24.7 | 55.6 | 27.6 |
| 3 | 0.7 | 4410 | 70.9 | 45.7 | 96.9 | 54.7 |
| Comp 4 | 2.3 | 4830 | 50.6 | 16.0 | 53.7 | 46.2 |
| 4 | 0.4 | 5280 | 61.8 | 46.3 | 72.2 | 57.6 |

TABLE 3

| Example No. | Residual Silanol Content (wt-%) | MQ Resin Mw (GPC) | Liner Release (N/dm) Initial | Liner Release (N/dm) Aged |
|---|---|---|---|---|
| Comp 1 | 2.0 | 2260 | 5.3 | 25.0 |
| 1 | 0.6 | 2800 | 6.2 | 8.2 |
| Comp 2 | 2.5 | 3160 | 0.5 | 36.1 |
| 2 | 0.5 | 4100 | 0.5 | 0.8 |
| Comp 3 | 2.6 | 3950 | 0.3 | 37.5 |
| 3 | 0.7 | 4410 | 0.3 | 0.6 |
| Comp 4 | 2.3 | 4830 | 0.4 | 26.4 |
| 4 | 0.4 | 5280 | 0.3 | 0.4 |

Examples 5, 6, and Comparative Example 5

Transfer tapes were prepared, as described in Example 1, using the components and amounts shown in Table 4. These tapes all contained 60% by weight MQ resin based on total composition weight.

TABLE 4

| Example No. | Amount Silicone Polyurea Polymer Solution | MQ Resin | Amount MQ Resin Solution | Amount Toluene | Amount IPA |
|---|---|---|---|---|---|
| Comp 5 | 50.8 | I | 31.7 | 70.3 | 8.0 |
| 5 | 50.0 | J | 30.0 | 70.5 | 7.8 |
| 6 | 50.0 | K | 31.9 | 68.5 | 7.8 |

The transfer tapes thus prepared were employed to construct 1 mm thick acrylic foam tapes having adhesive layers of the instant invention on both faces of the foam. Primer A was knife coated on top of the adhesive transfer tape and dried at 90° C. for 90 seconds to provide a dry primer thickness of 15 micrometers. The primed transfer tape was rolled down by hand onto each side of the acrylic foam, primer side to foam, and then fed through a 110° C. heated laminator at a rate of 0.7 meter per minute (m/min) to obtain a foam tape construction.

The acrylic foam tape was made as described in Example 7 of U.S. Pat. No. 4,749,590 (Klingen et al.) with the following exception. After the partial polymerization and before frothing, 0.19 part of additional 2,2-dimethoxy-2-phenyl acetophenone (available as IRGACURE 651 from Ciba Specialty Chemicals, Tarrytown, N.Y.), 0.55 part 1,6-hexanediol diacrylate (available as SR-238 from Sartomer, Exton, Pa.), 2 parts hydrophobic fumed silica (available as AEROSIL R972 from Degussa, Frankfurt, Germany), 8 parts glass microspheres (available as K-15 from 3M, St. Paul, Minn.), 0.57 part black pigment, and 1.54 parts surfactants were added to 100 parts of the syrup. The black pigment was a dispersion of 4.6 parts carbon black (available as Monarch 120 from Cabot Corporation, Billerica, Mass.) in 80.0 parts polypropylene glycol and 15.4 parts anhydrous stannous chloride. The surfactants were described in Example 1 of U.S. Pat. No. 5,024,880. The pressure sensitive foam tapes thus obtained were evaluated for peel adhesion, as described previously, and results are reported in Table 5.

TABLE 5

| Example No. | Residual Silanol Content (wt-%) | Peel Adhesion (N/dm) | | | | | |
|---|---|---|---|---|---|---|---|
| | | PP | | HDPE | | SS | |
| | | Initial | Aged | Initial | Aged | Initial | Aged |
| Comp 5 | 1.6 | 399 | 317 | 219 | 137 | 296 | 277 |
| 5 | 0.8 | 490 | 501 | 433 | 252 | 501 | 534 |
| 6 | 0.5 | 489 | 377 | 261 | 221 | 494 | 510 |

Example 7

A pressure sensitive adhesive solution was prepared as in Example 1 by combining 374 parts Silicone Polyurea Polymer solution, 230 parts MQ Resin L solution, 3.9 parts BRITOL 20 USP, 2.5 parts TINUVIN 328, 2.5 parts TINUVIN 292, 0.6 part IRGANOX 1076, and 386 parts toluene with stirring at room temperature.

An acrylic foam tape construction was prepared as described in Example 5, with the following exceptions. Primer B was used in place of Primer A to ensure adequate adhesion between the adhesive and the acrylic foam. The primer solution was knife coated on top of the adhesive transfer tape and dried for 3 minutes at 70° C. to provide a dry primer thickness of 7.6 micrometers. Lamination to the acrylic foam and peel testing were performed as described in Example 5, and results are reported in Table 6.

Example 8

An acrylic foam tape construction was prepared as described in Example 7, with the following exception. The acrylic foam was prepared according to the teachings of Example 1 of U.S. Pat. No. 6,103,152 (Gehlsen et al.).

A pressure sensitive adhesive composition was prepared by mixing 90 parts of 2-ethyl hexyl acrylate, 10 parts of acrylic acid, 0.15 part IRGACURE 651, and 0.03 part isooctyl thioglycolate. The composition was placed into packages measuring approximately 12.7 cm by 5.1 cm by 0.5 cm thick packages as described in U.S. Pat. No. 5,804,610 (Hamer et al.). The packaging film was 0.0635 mm thick ethylene vinyl acetate copolymer film (available as VA-24 Film from CT Film of Dallas, Tex.). The packages were immersed in a water bath and at the same time exposed to ultraviolet radiation at an intensity of 3.5 milliWatts per square centimeter and a total energy of 1627 milliJoules per square centimeter as measured by NIST units to form a packaged pressure sensitive adhesive. The packaged adhesive was then fed to a 152 mm single screw extruder and compounded. The temperatures in the extruder and the flexible hose at the exit end of the extruder were all set at 104° C. and the flow rate was controlled with a gear pump. The adhesive was then fed to a 58 mm co-rotating twin screw extruder operating at a screw speed of 200 rpm with a flow rate of about 500 pounds/hour (230 kilograms/hour). The temperature for all of the zones in the twin screw extruder was set at 71° C. Three parts per 100 parts of adhesive composition of expandable polymeric microspheres having a shell composition containing acrylonitrile and methacrylonitrile (available as MICROPEARL F-100D from Pierce Stevens, Buffalo, N.Y.) and 1.5 parts per 100 parts of adhesive composition of black pigment (available as No. 10085586 10% Black from Polyone, Eagan, Minn.) were added about three-fourths of the way down the extruder barrel. The hose temperature was set at 182° C. and the die temperature was set at 203° C. The extrudate was pumped to a 86.4 cm wide drop die, and the resulting foam sheet had a thickness of about 1 mm. The extruded sheet was cast onto a chill roll that was set at 38° C., cooled to about 25° C., and then transferred onto a 0.127 mm thick polyethylene release liner. The extruded sheet was then crosslinked using an electron beam processing unit operating at an accelerating voltage of 300 keV with a measured e-beam dose of 6 Megarads.

Lamination to the acrylic foam and peel testing were performed as described in Example 5 of the present invention, and results are reported in Table 6.

Example 9

An acrylic foam tape construction was prepared as described in Example 8, with the following exceptions. A pressure sensitive adhesive solution was prepared as in Example 1 by combining 1094 parts silicone polyurea polymer solution, 667 parts MQ Resin L solution, 11.1 parts BRITOL 20 USP, 3.6 parts TINUVIN 328, 3.6 parts CYASORB UV-3581, 3.6 parts CYASORB UV-1084, and 1115 parts toluene with stirring at room temperature. Primer C was used in place of Primer B to ensure adequate adhesion between the adhesive and acrylic foam. The pressure sensitive adhesive composition for the acrylic foam was prepared by mixing 95 parts of 2-ethylhexyl acrylate, 5 parts of acrylic acid, 0.15 parts IRGACURE 651, and 0.01 parts isooctyl thioglycolate.

Lamination to the acrylic foam and peel testing were performed as described in Example 5, and results are reported in Table 6.

TABLE 6

| Example No. | Residual Silanol Content (wt-%) | Peel Adhesion (N/dm) | | | |
|---|---|---|---|---|---|
| | | PP | | SS | |
| | | Initial | Aged | Initial | Aged |
| 7 | 0.8 | 517 | 611 | 513 | 594 |
| 8 | 0.8 | 429 | 517 | 443 | 606 |
| 9 | 0.8 | 454 | 416 | 430 | 411 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A pressure sensitive adhesive comprising:
   a silicone tackifying resin having no greater than about 1.5 wt-% Si—OH functional groups; and
   a polydiorganosiloxane polyurea copolymer, wherein the mole ratio of isocyanate to amine is in a range of about 0.9:1 to about 1.1:1.

2. The pressure sensitive adhesive of claim 1 wherein the pressure sensitive adhesive adheres to both high and low surface energy materials as well as those in between, wherein the high surface energy material has a surface energy above about 70 dynes/cm and the low surface energy material has a surface energy below about 50 dynes/cm.

3. The pressure sensitive adhesive of claim 1 wherein when the adhesive is disposed on a 50.8-micrometer thick PET backing at an adhesive thickness of 50.8 micrometers to form a single-coated tape and adhered to a high density polyethylene coupon, the tape displays a 180° peel force of at least about 55 N/dm when measured at a rate of 30.5 cm/min at room temperature after a dwell time of one minute at room temperature.

4. The pressure sensitive adhesive of claim 1 wherein when the adhesive is disposed on a 50.8-micrometer thick PET backing at an adhesive thickness of 50.8 micrometers to form a single-coated tape and adhered to a stainless steel coupon, the tape displays a 180° peel force of at least about 60 N/dm when measured at a rate of 30.5 cm/min at room temperature after a dwell time of one minute at room temperature.

5. The pressure sensitive adhesive of claim 1 wherein when the adhesive is disposed on a 1 millimeter thick 87.5/12.5 isooctyl acrylate/acrylic acid foam backing at an adhesive thickness of 50.8 micrometers to form a double-coated tape and adhered to a high density polyethylene coupon, the tape displays a 90° peel force of at least about 230 N/dm when measured at a rate of 30.5 cm/min at room temperature after a dwell time of 72 hours at room temperature.

6. The pressure sensitive adhesive of claim 1 wherein when the adhesive is disposed on a 1 millimeter thick 87.5/12.5 isooctyl acrylate/acrylic acid foam backing at an adhesive thickness of 50.8 micrometers to form a double-coated tape and adhered to a stainless steel coupon, the tape displays a 90° peel force of at least about 300 N/dm when measured at a rate of 30.5 cm/min at room temperature after a dwell time of 72 hours at room temperature.

7. The pressure sensitive adhesive of claim 1 wherein when the adhesive is disposed on a 1 millimeter thick 87.5/12.5 isooctyl acrylate/acrylic acid foam backing at an adhesive thickness of 50.8 micrometers to form a double-coated tape and adhered to a polypropylene coupon, the tape displays a 90° peel force of at least about 400 N/dm when measured at a rate of 30.5 cm/min at room temperature after a dwell time of 72 hours at room temperature.

8. The pressure sensitive adhesive of claim 1 wherein the polydiorganosiloxane polyurea copolymer is the reaction product of a polydiorganosiloxane polyamine with a polyisocyanate.

9. The pressure sensitive adhesive of claim 8 wherein the polydiorganosiloxane polyurea copolymer is the reaction product of a polydiorganosiloxane polyamine with a polyisocyanate and a polyfunctional chain extender.

10. The pressure sensitive adhesive of claim 1 wherein the polydiorganosiloxane polyurea copolymer comprises the following repeating unit:

each A is independently oxygen or —N(G)—, wherein each G is independently hydrogen, an alkyl moiety of 1 to 10 carbon atoms, phenyl, or a moiety that completes a ring structure including B to form a heterocycle;

B is an alkylene, aralkylene, cycloalkylene, phenylene, polyalkylene, polyalkylene oxide, copolymers, or mixtures thereof, or a moiety completing a ring structure including A to form a heterocycle;

m is a number that is 0 to about 1000;

n is a number that is equal to or greater than 1; and p is a number that is about 5 or larger.

11. The pressure sensitive adhesive of claim 10 wherein at least 50% of the R moieties are methyl moieties with the balance being monovalent alkyl or substituted alkyl moieties having 1 to 12 carbon atoms, alkenylene moieties, phenyl moieties, or substituted phenyl moieties.

12. The pressure sensitive adhesive of claim 10 wherein m is a number that is 0 to about 25.

13. The pressure sensitive adhesive of claim 10 wherein n is a number that is greater than 8.

14. The pressure sensitive adhesive of claim 10 wherein p is a number that is about 70 to about 1500.

15. The pressure sensitive adhesive of claim 1 wherein the silicone tackifying resin has no greater than about 1.2 wt-% Si—OH functional groups.

16. The pressure sensitive adhesive of claim 15 wherein the silicone tackifying resin has no greater than about 1.0 wt-% Si—OH functional groups.

17. The pressure sensitive adhesive of claim 1 wherein the silicone tackifying resin is present in an amount of at least about 55 wt-%, based on the weight of the silicone tackifying resin and the polydiorganosiloxane polyurea copolymer.

18. The pressure sensitive adhesive of claim 1 wherein the silicone tackifying resin has an M/Q ratio of at least about 0.7:1.0.

19. The pressure sensitive adhesive of claim 1 wherein the silicone tackifying resin has a molecular weight of about 100 to about 50,000.

20. The pressure sensitive adhesive of claim 1 further comprising a plasticizer.

21. The pressure sensitive adhesive of claim 1 which is solvent based.

22. A pressure sensitive adhesive comprising:

a silicone tackifying resin having no greater than about 1.5 wt-% Si—OH functional groups; and

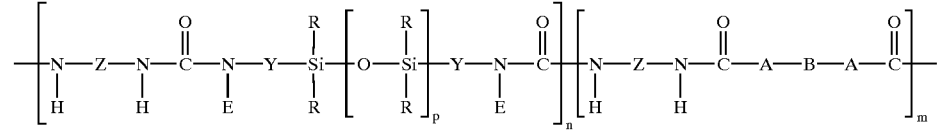

where:
each R is independently an alkyl moiety, a vinyl moiety or higher alkenyl moiety, a cycloalkyl moiety, an aryl moiety, or a fluorine-containing group;
each Z is independently a polyvalent moiety that is an arylene moiety, an aralkylene moiety, an alkylene moiety, or a cycloalkylene moiety;
each Y is independently a polyvalent moiety that independently is an alkylene moiety, an aralkylene moiety or an arylene moiety;
each E is independently hydrogen, an alkyl moiety of 1 to 10 carbon atoms, phenyl, or a moiety that completes a ring structure including Y to form a heterocycle;

a polydiorganosiloxane polyurea copolymer, wherein the mole ratio of isocyanate to amine is in a range of about 0.9:1 to about 1.1:1;
wherein the pressure sensitive adhesive satisfies at least one of the following criteria:
the pressure sensitive adhesive adheres to both high and low surface energy materials as well as those in between, wherein the high surface energy material has a surface energy above about 70 dynes/cm and the low surface energy material has a surface energy below about 50 dynes/cm;
when the adhesive is disposed on a 50.8-micrometer thick PET backing at an adhesive thickness of 50.8 micrometers to form a single-coated tape and adhered to a high density polyethylene coupon, the tape displays a 180° peel force of at least about 55 N/dm when measured at a rate of 30.5 cm/min at room temperature after a dwell time of one minute at room temperature;

when the adhesive is disposed on a 50.8-micrometer thick PET backing at an adhesive thickness of 50.8 micrometers to form a single-coated tape and adhered to a stainless steel coupon, the tape displays a 180° peel force of at least about 60 N/dm when measured at a rate of 30.5 cm/min at room temperature after a dwell time of one minute at room temperature;

when the adhesive is disposed on a 1 millimeter thick 87.5/12.5 isooctyl acrylate/acrylic acid foam backing at an adhesive thickness of 50.8 micrometers to form a double-coated tape and adhered to a high density polyethylene coupon, the tape displays a 90° peel force of at least about 230 N/dm when measured at a rate of 30.5 cm/min at room temperature after a dwell time of 72 hours at room temperature;

when the adhesive is disposed on a 1 millimeter thick 87.5/12.5 isooctyl acrylate/acrylic acid foam backing at an adhesive thickness of 50.8 micrometers to form a double-coated tape and adhered to a stainless steel coupon, the tape displays a 90° peel force of at least about 300 N/dm when measured at a rate of 30.5 cm/min at room temperature after a dwell time of 72 hours at room temperature; or when the adhesive is disposed on a 1 millimeter thick 87.5/12.5 isooctyl acrylate/acrylic acid foam backing at an adhesive thickness of 50.8 micrometers to form a double-coated tape and adhered to a polypropylene coupon, the tape displays a 90° peel force of at least about 400 N/dm when measured at a rate of 30.5 cm/min at room temperature after a dwell time of 72 hours at room temperature.

23. A pressure sensitive adhesive comprising:
a silicone tackifying resin having no greater than about 1.5 wt-% Si—OH functional groups and an M/Q ratio of at least about 0.7:1.0; and
a polydiorganosiloxane polyurea copolymer;
wherein the pressure sensitive adhesive adheres to both high and low surface energy materials as well as those in between, wherein the high surface energy material has a surface energy above about 70 dynes/cm and the low surface energy material has a surface energy below about 50 dynes/cm and
wherein an adhesive tape construction comprising the adhesive displays an at least about 53% greater aged peel performance to high density polyethylene or an at least about 24% greater aged peel performance to stainless steel relative to an adhesive tape construction comprising a comparable molecular weight silicone tackifying resin with greater than 1.5 wt-% silanol functionality.

24. The pressure sensitive adhesive of claim 23 wherein an adhesive tape construction comprising the adhesive displays a greater initial peel performance to high density polyethylene or stainless steel relative to an adhesive tape construction comprising a comparable molecular weight silicone tackifying resin with greater than 1.5 wt-% silanol functionality.

25. A pressure sensitive adhesive comprising:
a silicone tackifying resin having no greater than about 1.5 wt-% Si—OH functional groups and an M/Q ratio of at least about 0.7:1.0; and
a polydiorganosiloxane polyurea copolymer;
wherein the pressure sensitive adhesive adheres to both high and low surface energy materials as well as those in between, wherein the high surface energy material has a surface energy above about 70 dynes/cm and the low surface energy material has a surface energy below about 50 dynes/cm and
wherein a sample comprising the adhesive coated on a fluorosilicone-coated 50.8-micrometer-thick PET film at an adhesive thickness of about 50.8 micrometers and aged for one week at 70° C. followed by one day at room temperature, the force required to remove the film at an angle of 180° is no greater than about 20 N/dm.

26. The pressure sensitive adhesive of claim 23 further comprising a plasticizer.

27. A pressure sensitive adhesive comprising:
a silicone tackifying resin having no greater than about 1.5 wt-% Si—OH functional groups silicone and an M/Q ratio of at least about 0.7:1.0; and
a polydiorganosiloxane polyurea copolymer having a mole ratio of isocyanate to amine in a range of about 0.9:1 to 1.1:1 and comprising the following repeating unit:

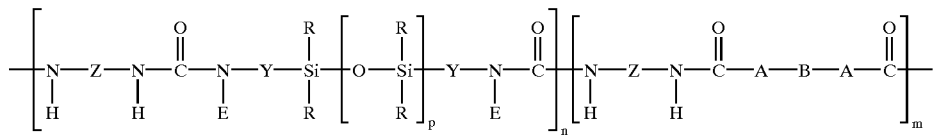

where:
each R is independently an alkyl moiety, a vinyl moiety or higher alkenyl moiety, a cycloalkyl moiety, an aryl moiety, or a fluorine-containing group;
each Z is independently a polyvalent moiety that is an arylene moiety, an aralkylene moiety, an alkylene moiety, or a cycloalkylene moiety;
each Y is independently a polyvalent moiety that independently is an alkylene moiety, an aralkylene moiety or an arylene moiety;
each E is independently hydrogen, an alkyl moiety of 1 to 10 carbon atoms, phenyl, or a moiety that completes a ring structure including Y to form a heterocycle;
each A is independently oxygen or —N(G)—, wherein each G is independently hydrogen, an alkyl moiety of 1 to 10 carbon atoms, phenyl, or a moiety that completes a ring structure including B to form a heterocycle;
B is an alkylene, aralkylene, cycloalkylene, phenylene, polyalkylene, polyalkylene oxide, copolymers, or mixtures thereof, or a moiety completing a ring structure including A to form a heterocycle;
m is a number that is 0 to about 1000;
n is a number that is equal to or greater than 1; and
p is a number that is about 5 or larger.

28. A pressure sensitive adhesive solution comprising:
a silicone tackifying resin having no greater than about 1.5 wt-% Si—OH functional groups;
a polydiorganosiloxane-polyurea copolymer, wherein the mole ratio of isocyanate to amine is in a range of about 0.9:1 to about 1.1:1;

an organic solvent; and a processing aid.

29. The pressure sensitive adhesive solution of claim 28 wherein the processing aid is transient.

30. An adhesive article comprising a backing and the pressure sensitive adhesive of claim 1 disposed on at least one major surface thereof.

31. The adhesive article of claim 30 wherein the backing is a foam backing.

32. The adhesive article of claim 30 which is a transfer tape.

33. The adhesive article of claim 30 further comprising a primer between the backing and the pressure sensitive adhesive.

34. The adhesive article of claim 33 wherein the primer comprises a polydiorganosiloxane polyurea copolymer comprising electron rich groups.

35. The adhesive article of claim 34 wherein the electron rich groups are tertiary amine groups, pyridine groups, and combinations thereof.

36. The adhesive article of claim 33 wherein the backing comprises acid functional groups.

37. An adhesive article comprising a backing and the pressure sensitive adhesive of claim 22 disposed on at least one major surface thereof.

38. The adhesive article of claim 37 wherein the backing is a foam backing.

39. The adhesive article of claim 37 which is a transfer tape.

40. The adhesive article of claim 37 further comprising a primer between the backing and the pressure sensitive adhesive.

41. The adhesive article of claim 40 wherein the primer comprises a polydiorganosiloxane polyurea copolymer comprising electron rich groups.

42. The adhesive article of claim 41 wherein the electron rich groups are tertiary amine groups, pyridine groups, and combinations thereof.

43. The adhesive article of claim 37 wherein the backing comprises acid functional groups.

44. An adhesive article comprising a backing and the pressure sensitive adhesive of claim 27 disposed on at least one major surface thereof.

45. The adhesive article of claim 44 wherein the backing is a foam backing.

46. The adhesive article of claim 44 which is a transfer tape.

47. The adhesive article of claim 44 further comprising a primer between the backing and the pressure sensitive adhesive.

48. The adhesive article of claim 47 wherein the primer comprises a polydiorganosiloxane polyurea copolymer comprising electron rich groups.

49. The adhesive article of claim 48 wherein the electron rich groups are tertiary amine groups, pyridine groups, and combinations thereof.

50. The adhesive article of claim 48 wherein the backing comprises acid functional groups.

51. An article comprising two substrates and the pressure sensitive adhesive of claim 1 disposed therebetween.

52. The article of claim 51 comprising a vibration damper, a reclosable fastener, a panel, an abrasive pad, a spacer, a body side molding, a flexographic plate, a muntin bar, a spacer, or a sign.

53. An article comprising two substrates and the pressure sensitive adhesive of claim 22 disposed therebetween.

54. The article of claim 53 comprising a vibration damper, a reclosable fastener, a panel, an abrasive pad, a spacer, a body side molding, a flexographic plate, a muntin bar, a spacer, or a sign.

55. An article comprising two substrates and the pressure sensitive adhesive of a claim 27 disposed therebetween.

56. The article of claim 55 comprising a vibration damper, a reclosable fastener, a panel, an abrasive pad, a spacer, a body side molding, a flexographic plate, a muntin bar, a spacer, or a sign.

57. A method of making a pressure sensitive adhesive comprising combining a silicone tackifying resin having no greater than about 1.5 wt-% Si—OH functional groups and a polydiorganosiloxane polyurea copolymer; wherein the mole ratio of isocyanate to amine is in a range of about 0.9:1 to about 1.1:1.

58. The method of claim 57 wherein the polydiorganosiloxane polyurea copolymer is prepared by reacting a polydiorganosiloxane polyamine with a polyisocyanate and a polyfunctional chain extender.

59. The method of claim 57 wherein the polydiorganosiloxane polyurea copolymer comprises the following repeating unit:

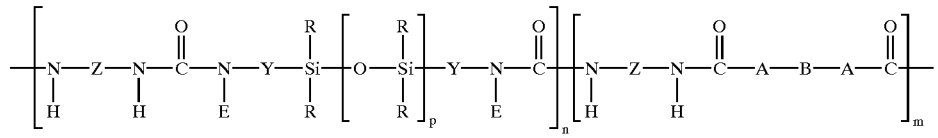

where:

each R is independently an alkyl moiety, a vinyl moiety or higher alkenyl moiety, a cycloalkyl moiety, an aryl moiety, or a fluorine-containing group;

each Z is independently a polyvalent moiety that is an arylene moiety, an aralkylene moiety, an alkylene moiety, or a cycloalkylene moiety;

each Y is independently a polyvalent moiety that independently is an alkylene moiety, an aralkylene moiety or an arylene moiety;

each E is independently hydrogen, an alkyl moiety of 1 to 10 carbon atoms, phenyl, or a moiety that completes a ring structure including Y to form a heterocycle;

each A is independently oxygen or —N(G)—, wherein each G is independently hydrogen, an alkyl moiety of 1 to 10 carbon atoms, phenyl, or a moiety that completes a ring structure including B to form a heterocycle;

B is an alkylene, aralkylene, cycloalkylene, phenylene, polyalkylene, polyalkylene oxide, copolymers, or mixtures thereof, or a moiety completing a ring structure including A to form a heterocycle;

m is a number that is 0 to about 1000;

n is a number that is equal to or greater than 1; and p is a number that is about 5 or larger.

60. The method of claim 59 wherein the silicone tackifying resin has no greater than about 1.2 wt-% Si—OH functional groups.

61. The method of claim 59 wherein the silicone tackifying resin is present in an amount of at least about 55 wt-%, based on the weight of the silicone tackifying resin and the polydiorganosiloxane polyurea copolymer.

62. The method of claim 59 wherein the silicone tackifying resin has an M/Q ratio of at least about 0.7:1.0.

63. A pressure sensitive adhesive comprising:
a silicone tackifying resin having no greater than about 1.5 wt-% Si—OH functional groups; and
a polydiorganosiloxane polyurea copolymer, wherein when the adhesive is disposed on a 50.8-micrometer thick PET backing at an adhesive thickness of 50.8 micrometers to form a single-coated tape and adhered to a high density polyethylene coupon, the tape displays a 180° peel force of at least about 55 N/dm when measured at a rate of 30.5 cm/min at room temperature after a dwell time of one minute at room temperature.

64. A pressure sensitive adhesive comprising:
a silicone tackifying resin having no greater than about 1.5 wt-% Si—OH functional groups; and
a polydiorganosiloxane polyurea copolymer, wherein when the adhesive is disposed on a 50.8 micrometer thick PET backing at an adhesive thickness of 50.8 micrometers to form a single-coated tape and adhered to a high density polyethylene coupon, the tape displays a 180° peel force of at least about 60 N/dm when measured at a rate of 30.5 cm/min at room temperature after a dwell time of one minute at room temperature.

65. A pressure sensitive adhesive comprising:
a silicone tackifying resin having no greater than about 1.5 wt-% Si—OH functional groups; and
a polydiorganosiloxane polyurea copolymer, wherein when the adhesive is disposed on a 1 millimeter thick 87.5/12.5 isooctyl acrylate/acrylic acid foam backing at an adhesive thickness of 50.8 micrometers to form a double-coated tape and adhered to a high density polyethylene coupon, the tape displays a 90° peel force of at least about 230 N/dm when measured at a rate of 30.5 cm/min at room temperature after a dwell time of 72 hours at room temperature.

66. A pressure sensitive adhesive comprising:
a silicone tackifying resin having no greater than about 1.5 wt-% Si—OH functional groups; and
a polydiorganosiloxane polyurea copolymer, wherein when the adhesive is disposed on a 1 millimeter thick 87.5/12.5 isooctyl acrylate/acrylic acid foam backing at an adhesive thickness of 50.8 micrometers to form a double-coated tape and adhered to a high density polyethylene coupon, the tape displays a 90° peel force of at least about 300 N/dm when measured at a rate of 30.5 cm/min at room temperature after a dwell time of 72 hours at room temperature.

67. A pressure sensitive adhesive comprising:
a silicone tackifying resin having no greater than about 1.5 wt-% Si—OH functional groups; and
a polydiorganosiloxane polyurea copolymer, wherein when the adhesive is disposed on a 1 millimeter thick 87.5/12.5 isooctyl acrylate/acrylic acid foam backing at an adhesive thickness of 50.8 micrometers to form a double-coated tape and adhered to a high density polyethylene coupon, the tape displays a 90° peel force of at least about 400 N/dm when measured at a rate of 30.5 cm/min at room temperature after a dwell time of 72 hours at room temperature.

68. An adhesive article comprising a backing and a pressure sensitive adhesive comprising a silicone tackifying resin having no greater than about 1.5 wt-% Si—OH functional groups; and
a polydiorganosiloxane polyurea copolymer, disposed on at least one major surface thereof, and a primer between the backing and the pressure sensitive adhesive wherein the primer comprises a polydiorganosiloxane polyurea copolymer comprising electron rich groups.

69. An adhesive article comprising: a backing;
a pressure sensitive adhesive comprising a silicone tackifying resin having no greater than about 1.5 wt-% Si—OH functional groups; and
a polydiorganosiloxane polyurea copolymer, disposed on at least one major surface thereof;
and a primer comprising a polydiorganosiloxane polyurea copolymer comprising electron rich groups disposed between the backing and the pressure sensitive adhesive, wherein the pressure sensitive adhesive satisfies at least one of the following criteria:
the pressure sensitive adhesive adheres to both high and low surface energy materials as well as those in between, wherein the high surface energy material has a surface energy above about 70 dynes/cm and the low surface energy material has a surface energy below about 50 dynes/cm;
when the adhesive is disposed on a 50.8-micrometer thick PET backing at an adhesive thickness of 50.8 micrometers to form a single-coated tape and adhered to a high density polyethylene coupon, the tape displays a 180° peel force of at least about 55 N/dm when measured at a rate of 30.5 cm/min at room temperature after a dwell time of one minute at room temperature;
when the adhesive is disposed on a 50.8 micrometer thick PET backing at an adhesive thickness of 50.8 micrometers to form a single-coated tape and adhered to a stainless steel coupon, the tape displays a 180° peel force of at least about 60 N/dm when measured at a rate of 30.5 cm/min at room temperature after a dwell time of one minute at room temperature;
when the adhesive is disposed on a 1 millimeter thick 87.5/12.5 isooctyl acrylate/acrylic acid foam backing at an adhesive thickness of 50.8 micrometers to form a double-coated tape and adhered to a high density polyethylene coupon, the tape displays a 90° peel force of at least about 230 N/dm when measured at a rate of 30.5 cm/mm at room temperature after a dwell time of 72 hours at room temperature;
when the adhesive is disposed on a 1 millimeter thick 87.5/12.5 isooctyl acrylate/acrylic acid foam backing at an adhesive thickness of 50.8 micrometers to form a double-coated tape and adhered to a stainless steel coupon, the tape displays a 90° peel force of at least about 300 N/dm when measured at a rate of 30.5 cm/min at room temperature after a dwell time of 72 hours at room temperature; or
when the adhesive is disposed on a 1 millimeter thick 87.5/12.5 isooctyl acrylate/acrylic acid foam backing at an adhesive thickness of 50.8 micrometers to form a double-coated tape and adhered to a polypropylene coupon, the tape displays a 90° peel force of at least about 400 N/dm when measured at a rate of 30.5 cm/min at room temperature after a dwell time of 72 hours at room temperature.

70. An adhesive article comprising: a backing;
a pressure sensitive adhesive comprising a silicone tackifying resin having no greater than about 1.5 wt-% Si—OH functional groups; and
a polydiorganosiloxane polyurea copolymer, disposed on at least one major surface thereof; and a primer comprising a polydiorganosiloxane polyurea copolymer comprising electron rich groups disposed between the backing and the pressure sensitive adhesive, wherein the polydiorganosiloxane polyurea copolymer comprises the repeating unit:

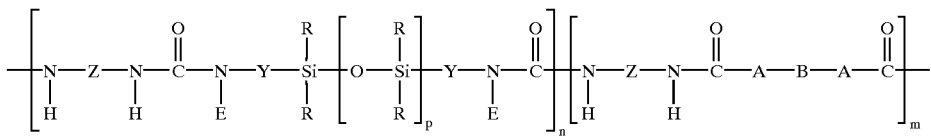

where:
- each R is independently an alkyl moiety, a vinyl moiety or higher alkenyl moiety, a cycloalkyl moiety, an aryl moiety, or a fluorine-containing group;
- each Z is independently a polyvalent moiety that is an arylene moiety, an aralkylene moiety, an alkylene moiety, or a cycloalkylene moiety;
- each Y is independently a polyvalent moiety that independently is an alkylene moiety, an aralkylene moiety or an arylene moiety;
- each E is independently hydrogen, an alkyl moiety of 1 to 10 carbon atoms, phenyl, or a moiety that completes a ring structure including Y to form a heterocycle;
- each A is independently oxygen or —N(G)—, wherein each G is independently hydrogen, an alkyl moiety of 1 to 10 carbon atoms, phenyl, or a moiety that completes a ring structure including B to form a heterocycle;
- B is an alkylene, aralkylene, cycloalkylene, phenylene, polyalkylene, polyalkylene oxide, copolymers, or mixtures thereof, or a moiety completing a ring structure including A to form a heterocycle;
- m is a number that is 0 to about 1000;
- n is a number that is equal to or greater than 1; and
- p is a number that is about 5 or larger.

* * * * *

UNITED STATES PATENT AND TRADEMARK OFFICE
CERTIFICATE OF CORRECTION

PATENT NO. : 6,730,397 B2
APPLICATION NO. : 10/027587
DATED : May 4, 2004
INVENTOR(S) : Kurt C. Melancon It is certified that error appears in the above-identified patent and that said Letters Patent is hereby corrected as shown below:

Column 28
Line 10, in Claim 55, after "of" delete "a".
Line 18, in Claim 57, delete ";" and insert -- , --, therefor.

Column 30
Line 40, in Claim 69, delete "cm/mm" and insert -- cm/min --, therefor.

Signed and Sealed this

Twenty-eighth Day of November, 2006

JON W. DUDAS
*Director of the United States Patent and Trademark Office*